US012786527B2

(12) United States Patent
Yoo et al.

(10) Patent No.: US 12,786,527 B2
(45) Date of Patent: Nov. 3, 2026

(54) DISPLAY DEVICE AND METHOD FOR OPERATING SAME

(71) Applicant: LG ELECTRONICS INC., Seoul (KR)

(72) Inventors: Huisang Yoo, Seoul (KR); Youngwook Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/848,630

(22) PCT Filed: Mar. 22, 2022

(86) PCT No.: PCT/KR2022/004008
§ 371 (c)(1),
(2) Date: Sep. 19, 2024

(87) PCT Pub. No.: WO2023/182542
PCT Pub. Date: Sep. 28, 2023

(65) Prior Publication Data

US 2025/0211836 A1 Jun. 26, 2025

(51) Int. Cl.
*H04N 21/8549* (2011.01)
*G06V 20/40* (2022.01)
*H04N 21/439* (2011.01)
*H04N 21/44* (2011.01)
*H04N 21/466* (2011.01)

(52) U.S. Cl.
CPC ..... *H04N 21/8549* (2013.01); *H04N 21/4394* (2013.01); *H04N 21/44008* (2013.01); *H04N 21/4667* (2013.01)

(58) Field of Classification Search
None
See application file for complete search history.

(56) References Cited

U.S. PATENT DOCUMENTS 9,654,845 B2 5/2017 Yoo et al.
9,798,934 B2 10/2017 Cho
2010/0172591 A1* 7/2010 Ishikawa ................ G10L 25/48 348/E9.034
2015/0106842 A1* 4/2015 Lee .................. H04N 21/23418 725/32

(Continued)

FOREIGN PATENT DOCUMENTS

KR 1020150141059 12/2015
KR 1020160043865 4/2016

(Continued)

OTHER PUBLICATIONS

PCT International Application No. PCT/KR2022/004008, International Search Report dated Dec. 21, 2022, 3 pages.

*Primary Examiner* — Hung Q Dang
(74) *Attorney, Agent, or Firm* — LEE, HONG, DEGERMAN, KANG & WAIMEY

(57) ABSTRACT

The present disclosure relates to a display device and an operating method thereof to provide abbreviated content that summarizes broadcast programs or OTT-based videos. A display device according to an embodiment of the present disclosure generates and provides abbreviated content by selecting preferred content on the basis of a viewing history of a user and processing the content according to a preference of the user.

15 Claims, 14 Drawing Sheets

(56) References Cited

U.S. PATENT DOCUMENTS

| | | | |
|---|---|---|---|
| 2015/0356356 A1 | 12/2015 | Han et al. | |
| 2017/0178623 A1* | 6/2017 | Shamir | G10L 15/1822 |
| 2021/0112021 A1* | 4/2021 | Rahalkar | H04L 51/02 |
| 2022/0067383 A1 | 3/2022 | Hu et al. | |

FOREIGN PATENT DOCUMENTS

| | | |
|---|---|---|
| KR | 1020160057864 | 5/2016 |
| KR | 102369620 | 3/2022 |
| KR | 1020220026471 | 3/2022 |

* cited by examiner

DISPLAY DEVICE AND METHOD FOR OPERATING SAME

CROSS-REFERENCE TO RELATED APPLICATION(S)

This application is the National Stage filing under 35 U.S.C. 371 of International Application No. PCT/KR2022/004008, filed on Mar. 22, 2022, the contents of which are all incorporated by reference herein in its entirety.

TECHNICAL FIELD

The present disclosure relates to a display device and an operating method thereof.

BACKGROUND ART

With the development of the Internet, an infrastructure has been established that allows anyone to easily search and consume content, and with the popularization of mobile devices, people have been able to consume media content without being restricted by location. Amid these changes, people have increased their desire/tendency to consume content for as long as they want within the available time, and as a result, there have been significant changes in media consumption patterns. People tend to avoid long videos due to problems such as lack of time and concentration, and when consuming media content, they have a growing desire to reduce unnecessary time wasted due to watching unwanted content and to utilize spare time to consume media.

This change in media consumption patterns has also affected the content production sector, and has led to the emergence of a new form of content referred to as short-content. For example, TikTok and YouTube have provided a series of processes for producing/distributing/consuming content as services, and have led to an explosive increase in short-content. As the personal media industry is being reorganized around short-content, original content production companies such as broadcasting stations are joining the trend by starting clip-type media services that provide short, abbreviated versions of existing long-form media content.

On the other hand, in the era of exponentially increasing media content, users have the advantage of being able to experience and choose from a variety of media content, but on the other hand, they also have the problem of spending a lot of time or having difficulty finding the content they want among too much content. To solve this problem, broadcast-based broadcasting station-centered real-time broadcasting services are providing additional services such as program guides and reservation viewing services, and broadband-based OTT services such as Netflix and YouTube are providing user-friendly services such as advanced search techniques and recommendation services.

However, program guides and reservation viewing services in the broadcast sector have the inconvenience of requiring users to search and set their preferred content themselves, and search/recommendation services in the broadband sector have the inconvenience of requiring an additional selection process to select content that suits their tastes among the many and diverse contents presented as search/recommendation results.

In addition, in the case of series, when a new series is distributed, if the content of the existing series is not well remembered, there is the inconvenience of having to watch the existing series again, and in the case of sports or news content, some users may want to watch only the main scenes or news rather than watch the entire content for a long time, but the current system has the inconvenience of requiring users to search for edited videos themselves or manually manipulate them (e.g., Fast Forward) to watch them.

In addition, existing abbreviated content services have the problem of not efficiently connecting producers who produce abbreviated content and consumers who consume it. Currently, most abbreviated content is produced by broadcasting stations or individuals and distributed through broadcasting stations' own platforms or YouTube. Therefore, if a user wants content, he or she must search for it directly in a specific application or website and watch it. For example, if a user who enjoys watching sports on TV wants to see abbreviated content about today's game, he or she must search for related content on the Internet or YouTube, and then select and watch the appropriate abbreviated content he or she wants from the search results, which is a cumbersome process.

DISCLOSURE

Technical Problem

The purpose of the present disclosure is to provide a display device and an operating method thereof that improve the above-described problems or inconveniences.

The purpose of the present disclosure is to provide abbreviated content that summarizes broadcast programs or OTT-based videos.

The purpose of the present disclosure is to provide abbreviated content summarized with user-preferred videos from specific content.

The purpose of the present disclosure is to provide a display device and an operating method thereof that recommends abbreviated content at an appropriate timing by considering at least one of a user's viewing pattern or viewing situation.

The purpose of the present disclosure is to generate and provide abbreviated content that minimizes audio/video disconnection problems.

The purpose of the present disclosure is to generate and provide abbreviated content that minimizes audio and video cut-off.

Technical Solution

The display device according to the embodiment of the present disclosure can generate and provide abbreviated content by selecting preferred content based on the user's viewing history and processing it according to the user's preference.

The display device according to the embodiment of the present disclosure can obtain a recommendation time point of customized abbreviated content based on at least one of the user's viewing pattern or current viewing situation.

The display device according to the embodiment of the present disclosure can generate abbreviated content by referencing both video and audio when generating abbreviated content.

The display device according to the embodiment of the present disclosure can comprise a controller configured to receive content, and generate an abbreviated content of the content received; and a display configured to display the abbreviated content, wherein the controller is configured to generate the abbreviated content including first frames extracted based on video of the content and second frames extracted based on audio of the content.

The controller can extract the second frame so that a sentence spoken in a playback section of the first frames does not break.

The controller can extract, in addition to the first frame, frame to which a spoken sentence belongs during a playback section of the first frame as the second frame.

The controller can extract the second frames using a start point and an end point of each sentence included in the audio.

The controller can extract frames of a section in which an entire detected sentence is reproduced as the second frames when a sentence having only one of the start point and the end point is detected in a playback section of the first frames.

The controller can obtain the start point and the end point of each sentence by analyzing a voice included in the audio.

The controller can obtain the start point and the end point of each sentence based on at least one of pitch, energy, and speech rate of the voice included in the audio.

The controller can recognize a combination of words continuously spoken within a predetermined time in the audio as the sentence, and obtain the start point and the end point of the recognized sentence.

The controller can extract the first frame by segmenting frames of the received content into predetermined units, extracting a feature value for each segmented unit, and calculating an importance score for the extracted feature value.

The controller can extract the second frames based on whether a playback section of the first frames matches a playback section of a sentence obtained based on the audio after extracting the first frames.

The controller can extract frames in the section that does not belong to the playback section of the first frames during the playback section of the sentence as the second frames.

The controller can detect a scene transition point based on the video, and obtain the first frames based on the detected scene transition point.

The controller can detect the scene transition point by detecting change in person, space, or time.

The controller can extract a keyword from the audio and extract the second frames based on a sentence that includes the extracted keyword.

The controller can comprise a video extractor configured to extract the video, an audio extractor configured to extract the audio, and an abbreviated content generator configured to extract the first frames and the second frames to generate the abbreviated content.

Advantageous Effects

According to an embodiment of the present disclosure, since specific content is provided as abbreviated content summarized into user-preferred frames, the user does not have to search for specific content one by one or search for content desired from specific content, so there is an advantage of greatly improving user convenience.

According to an embodiment of the present disclosure, there is an advantage of increasing accessibility to abbreviated content by recognizing the user's viewing situation, obtaining a recommendation timing, and providing abbreviated content.

According to an embodiment of the present disclosure, there is an advantage of continuously improving abbreviated content to be more customized for the user by updating user preferences depending on whether the abbreviated content is viewed.

According to an embodiment of the present disclosure, since abbreviated content is generated based on scene change points and sentence boundary points, there is an advantage of minimizing video/audio cut-off problems, and thus increasing the completeness of the abbreviated content.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions. Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
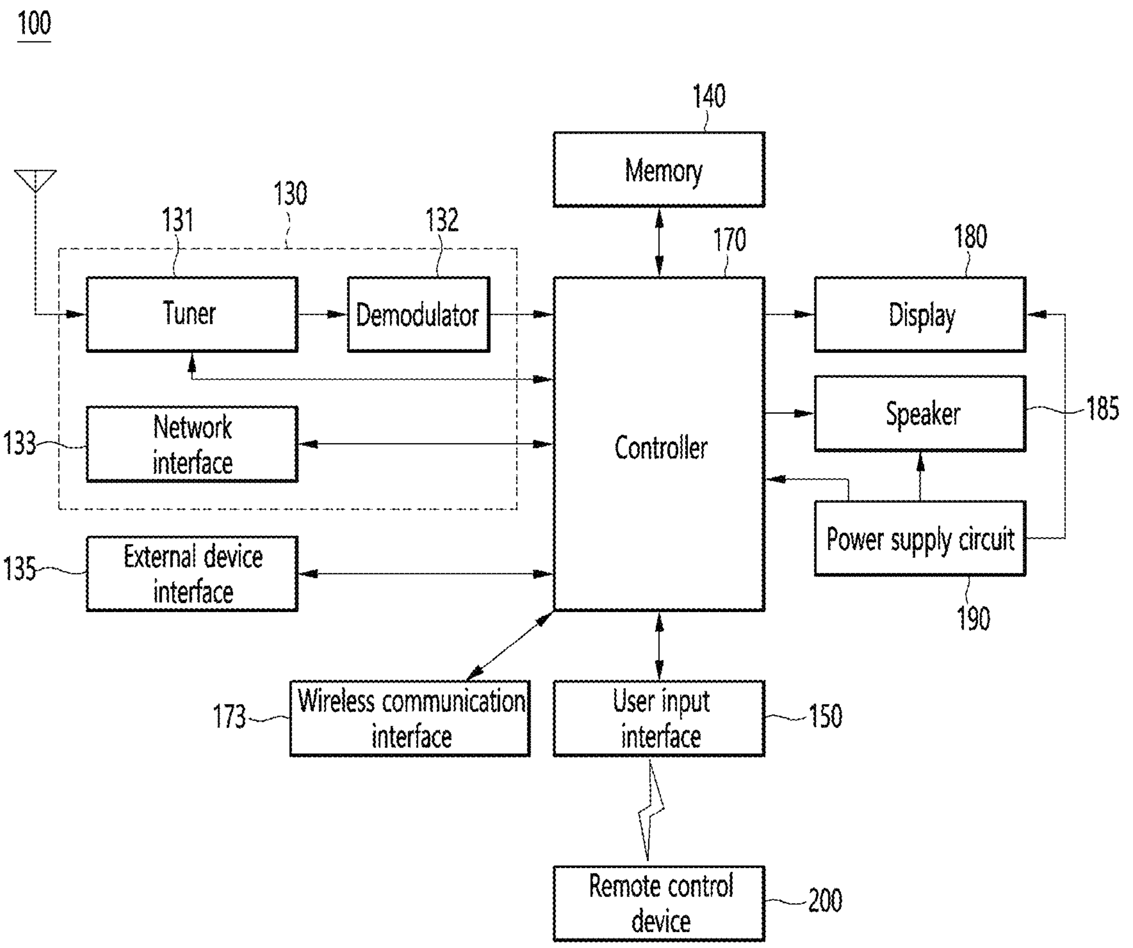
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a contents provider or a network operator. That is, the network interface 133 may receive content such as movies, advertisements, games, VOD, and broadcast signals and information related thereto provided from a contents provider or a network provider through a network.

In addition, the network interface 133 may receive update information and update files of firmware provided by the network operator, and may transmit data to an Internet or contents provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure. According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
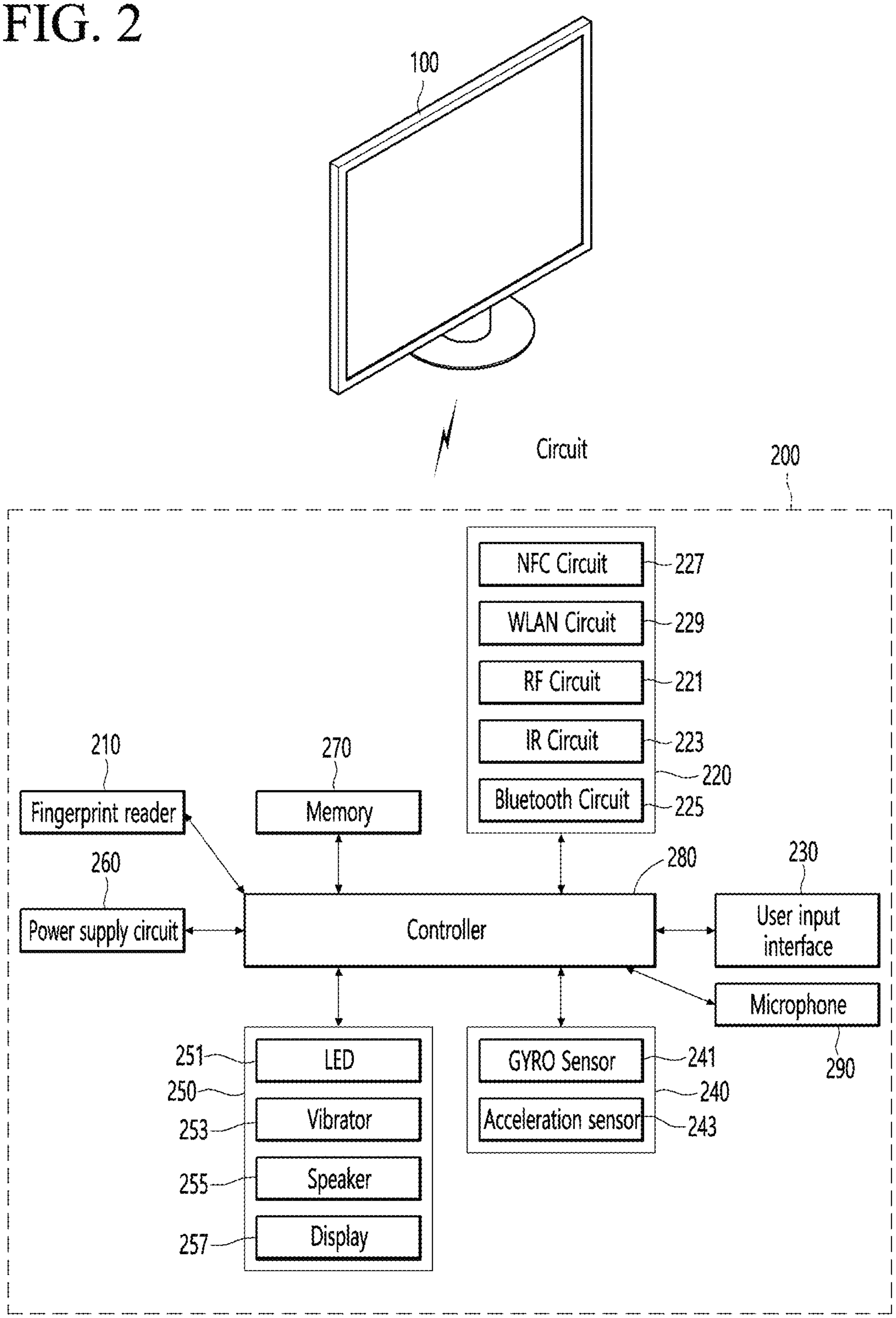
FIG. 2 is a block diagram of a remote control device according to an embodiment of the present disclosure.
Figure 3:
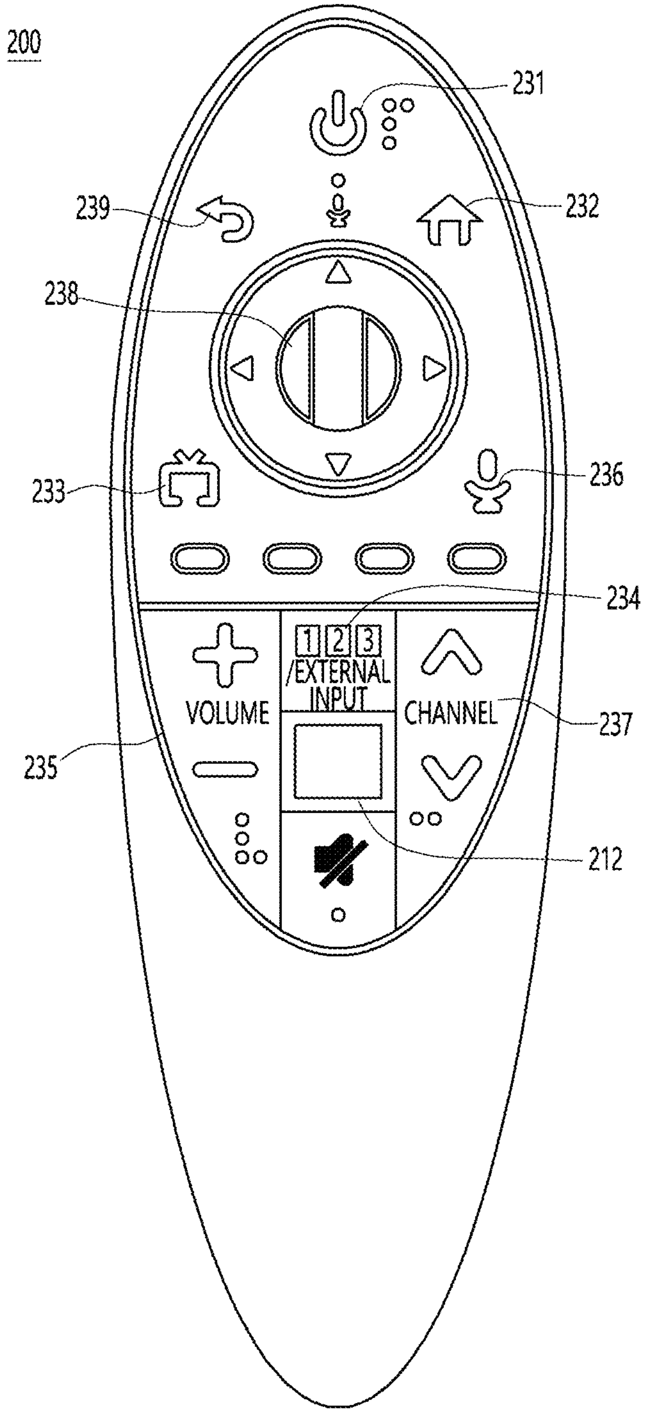
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
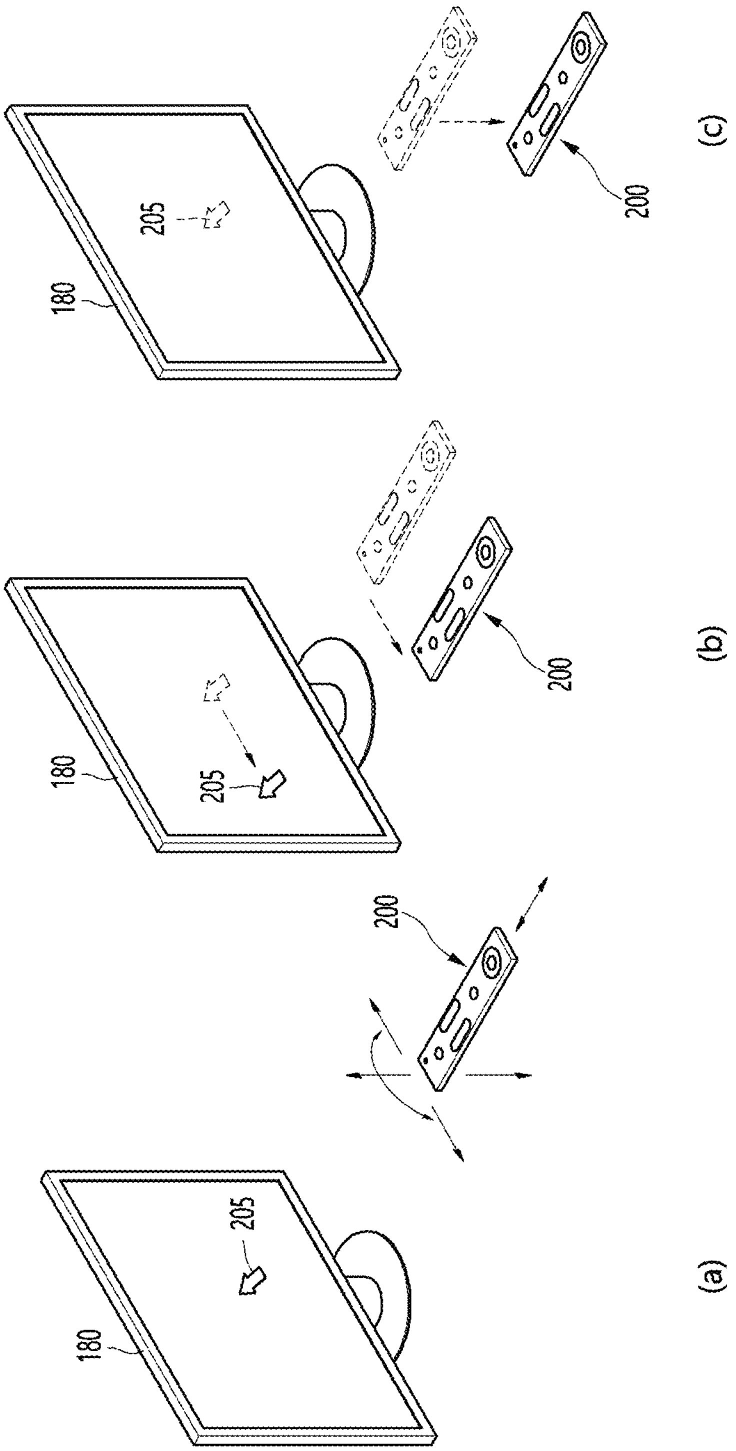
FIG. 4 shows an example of utilizing a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Meanwhile, the display device 100 according to the embodiment of the present disclosure recommends content that the user may be interested in among various contents provided based on broadcast or broadband, and provides the recommended content in a summarized form.

Figure 5:
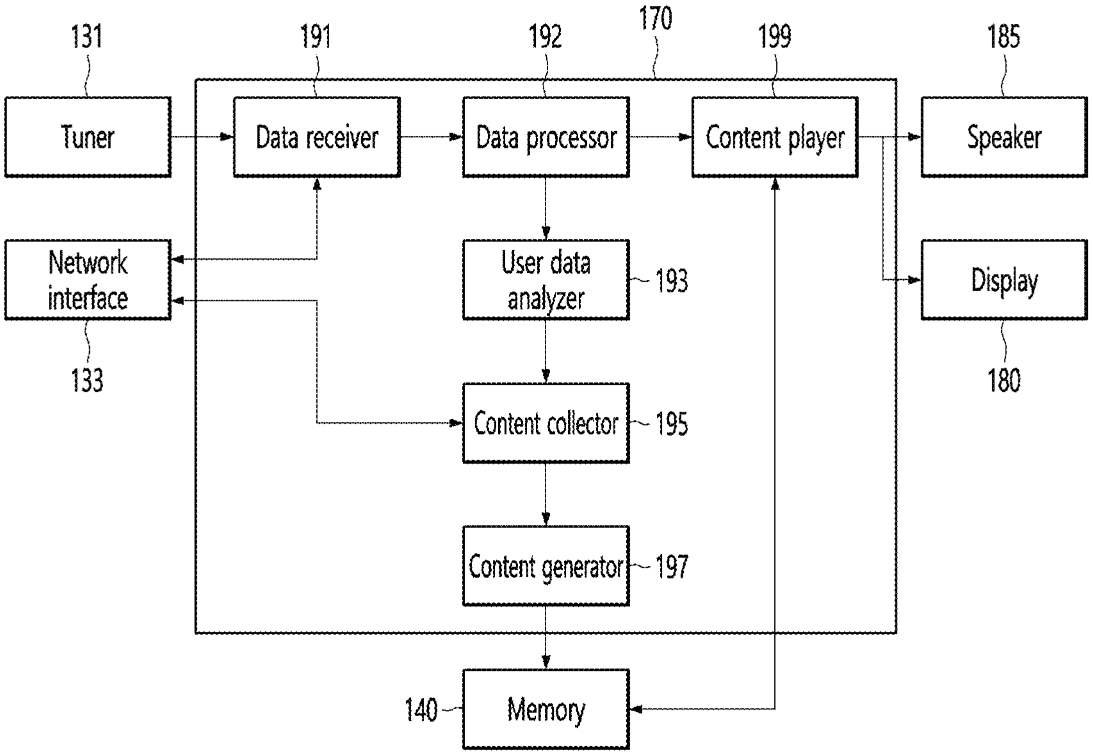
FIG. 5 is a block diagram illustrating a configuration of a display device according to an embodiment of the present disclosure for providing abbreviated content.

FIG. 5 is a block diagram illustrating a configuration for providing abbreviated content by the display device according to the embodiment of the present disclosure.

Among the components illustrated in FIG. 5, the components whose drawing symbols match those illustrated in FIG. 1 may be the same components.

The tuner 131 can receive a broadcast signal. That is, the tuner 131 can receive broadcast-based content.

The network interface 133 can provide an interface for connecting to a wired/wireless network. The network interface 133 can receive wired/wireless network-based, i.e., broadband-based content.

The controller 170 can receive content from at least one of the tuner 131 and the network interface 133, and generate abbreviated content that summarizes the received content. The controller 170 can store the generated abbreviated content in the memory 140 and output it through the speaker 185 and the display 180.

More specifically, the controller 170 may include at least some or all of the data receiver 191, the data processor 192, the user data analyzer 193, the content collector 195, the content generator 197, and the content player 199. Meanwhile, the detailed components of the controller 170 are merely examples for the convenience of explanation, and some of the above-described components may be omitted or other components may be further included.

The data receiver 191 can receive content from the tuner 131 or the network interface 133. The data receiver 191 can transmit the received content to the data processor 192.

The data processor 192 can receive content from the data receiver 191. The data processor 192 can extract metadata from the input content. For example, the data processor 192 can extract metadata such as viewing time, genre, and characters from the input content. In other words, the data processor 192 can extract metadata necessary for user preference analysis from the content. The data processor 192 can transmit the extracted metadata to the user data analyzer 193.

The user data analyzer 193 can analyze user preferences through metadata of content viewed by the user. The user data analyzer 193 can obtain user preferences by analyzing metadata received from the data processor 192.

The user data analyzer 193 can learn information about content that the user usually enjoys and extract information for selecting preferred content. In other words, the user data analyzer 193 can extract information for obtaining user preferred content by learning information about all content viewed by the user.

In addition, the user data analyzer 193 can obtain the user's main viewing time zone. In other words, the user data analyzer 193 can obtain viewing pattern information about what content the user mainly watches at what time zone.

The content collector 195 can collect content according to user preference. The content collector 195 can collect content according to user preference acquired from the user data analyzer 193. In other words, the content collector 195 can collect content corresponding to user preference. The content collector 195 can receive content corresponding to user preference through the tuner 131 or the network interface 133.

The content generator 197 can generate abbreviated content that summarizes the content collected by the content collector 195. In other words, the content generator 197 can process the content collected by the content collector 195 to generate abbreviated content.

The memory 140 can store the abbreviated content generated by the content generator 197. Meanwhile, the abbreviated content can also be stored in the edge cloud.

The edge cloud may be a server for content distribution processing of a CDN (Content Delivery Network). Content providers may build and operate a cache server called a CDN, and manage content by distributing and storing it in the edge cloud to reduce the load concentrated on the core cloud.

The content player 199 may configure resources for playing content, particularly abbreviated content. Specifically, the content player 199 may perform pipeline creation, codec designation, etc. for playing abbreviated content.

The content player 199 may transmit abbreviated content data to the speaker 185 and the display 180 so that the abbreviated content is output.

The speaker 185 and the display 180 can output abbreviated content based on the abbreviated content data transmitted.

Figure 6:
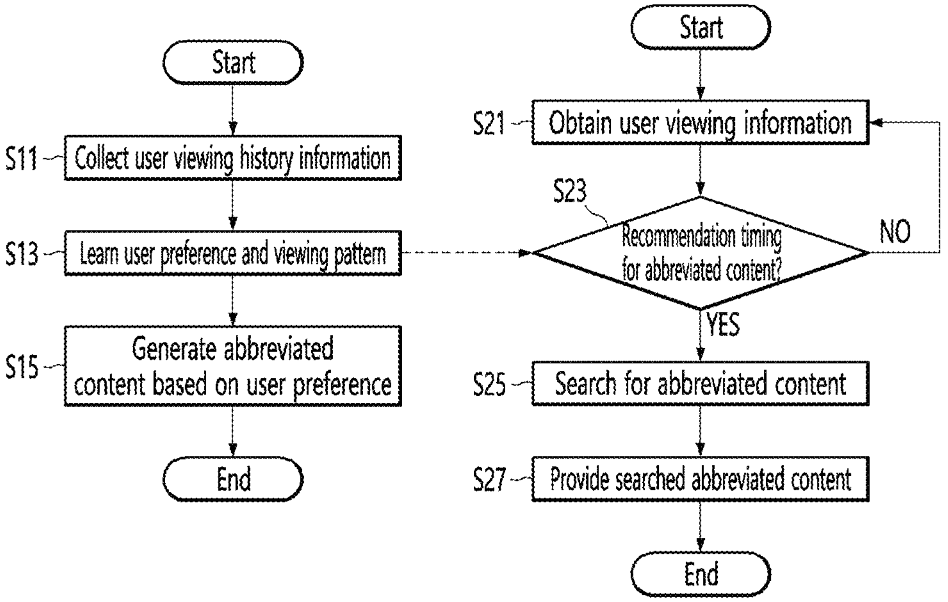
FIG. 6 is a flowchart illustrating a method for a display device according to an embodiment of the present disclosure to provide abbreviated content.

FIG. 6 is a flowchart illustrating a method for a display device to provide abbreviated content according to an embodiment of the present disclosure.

The controller 170 can collect user viewing history information (S11).

User viewing history information may refer to information about content that the user has viewed so far. For example, user viewing history information may include viewing time and viewed content (including metadata).

That is, the controller 170 may collect information about content that the user has viewed in order to analyze user preferences and viewing patterns.

The controller 170 may learn user preferences and viewing patterns (S13).

The controller 170 can learn user preferences and viewing patterns based on user viewing history information. Accordingly, the controller 170 can obtain user preferences and viewing patterns, respectively.

According to an embodiment, the controller 170 can update user preferences and viewing patterns whenever user viewing history information is obtained.

The user preferences can include genres of content frequently viewed by the user. For example, the controller 170 can classify and count genres of content viewed by the user, and obtain the top three genres as user preferences.

The viewing patterns can include time zones in which the user views content. More specifically, the viewing patterns can include viewing time zones for each content genre. For example, the controller 170 can obtain viewing patterns in which the viewing time zone of the content of the first genre is the first time zone, and the viewing time zone of the content of the second genre is the second time zone.

The controller 170 can generate abbreviated content based on user preference (S15).

The controller 170 can collect content of interest based on user preference.

The controller 170 can obtain content preferred by the user based on user preference and generate abbreviated content of the obtained content. The controller 170 can extract some frames from the original content based on user preference and generate abbreviated content composed of the extracted frames. Here, the original content can be content that includes all omitted frames before being summarized into the abbreviated content.

That is, step S15 can be a step of processing the original content. The controller 170 can generate abbreviated content customized for the user based on user viewing history information. Specifically, the controller 170 may abbreviate the original content to a user-preferred length (total playback time), and may reflect the user preference in the abbreviation process. For example, if the controller 170 obtains the action genre as the user preference, it may generate an abbreviated content in which the ratio of action scenes is higher than that of other scenes.

The controller 170 can extract frames to be included in the abbreviated content from the original content based on the attention mechanism. The method of generating the abbreviated content will be described in more detail in FIGS. 7 to 13.

As described above, the controller 170 can generate the abbreviated content in advance. In addition, the controller 170 can periodically collect user viewing history information to update user preferences and viewing patterns. The controller 170 can periodically generate and update the abbreviated content.

The controller 170 can obtain user viewing information (S21).

The user viewing information may refer to information about the current user's viewing status. For example, the user viewing information may include input information of the remote control device 200, information about the channel being viewed, information about the content being viewed, etc.

The controller 170 can determine whether it is a recommendation timing for abbreviated content based on user viewing information (S23).

The controller 170 can determine whether the abbreviated content is recommended based on the user viewing information. That is, the controller 170 can determine whether or not it is time to recommend abbreviated content based on user viewing information.

The controller 170 can use a model that has learned user preferences and viewing patterns to determine the recommendation timing of the abbreviated content. That is, whether it is the right time to recommend abbreviated content by using a model that has learned user preferences and viewing patterns.

According to one embodiment, the controller 170 can recognize that the content displayed on a channel changed according to the user input is the user preferred content as the recommendation timing of the abbreviated content and can recommend the abbreviated content.

According to another embodiment, the controller 170 can recognize the user viewing situation and determine whether it is a recommended timing for the abbreviated content based on the user viewing situation. That is, since the recommended timing (time) is different depending on the type of content (e.g., genre), the controller 170 can determine whether it is a recommended timing for the abbreviated content by obtaining the user's current viewing situation based on the user viewing information. For example, the controller 170 can determine whether it is a recommended timing for the abbreviated content based on the user's input of changing the channel, and this will be described in detail with reference to FIGS. 14 and 15.

The controller 170 can continue to obtain the user viewing information if it is not determined to be a recommended timing.

The controller 170 can search for abbreviated content when it is determined to be a recommended timing (S25).

The controller 170 can search for abbreviated content to be recommended based on user viewing information when it is determined to be a recommended timing. The controller 170 can search for abbreviated content to be recommended from abbreviated contents stored in memory 140 or abbreviated contents stored in an edge cloud (not shown).

According to an embodiment, the controller 170 can generate recommended abbreviated content if the abbreviated content is not searched.

The controller 170 can provide the searched abbreviated content (S27).

The controller 170 can directly output the searched abbreviated content, or display a screen recommending the searched abbreviated content to confirm whether the searched abbreviated content is recommended.

Through this, the controller 170 can control the display 180 to display the abbreviated content generated based on the user preference. Meanwhile, the abbreviated content here may be content composed of some frames extracted based on the user preference from the original content.

Meanwhile, if the user watches the provided abbreviated content, the information about the watched abbreviated content can be used again in step S13. That is, if the controller 170 learns the user preference and viewing pattern, the controller 170 can use the information about the abbreviated content watched by the user. The controller 170 can update the user preference based on whether the abbreviated content is watched. Accordingly, there is an advantage that the controller 170 is able to learn the user preference more accurately.

Next, referring to FIGS. 7 to 13, a method for generating abbreviated content will be described in detail.

Figure 7:
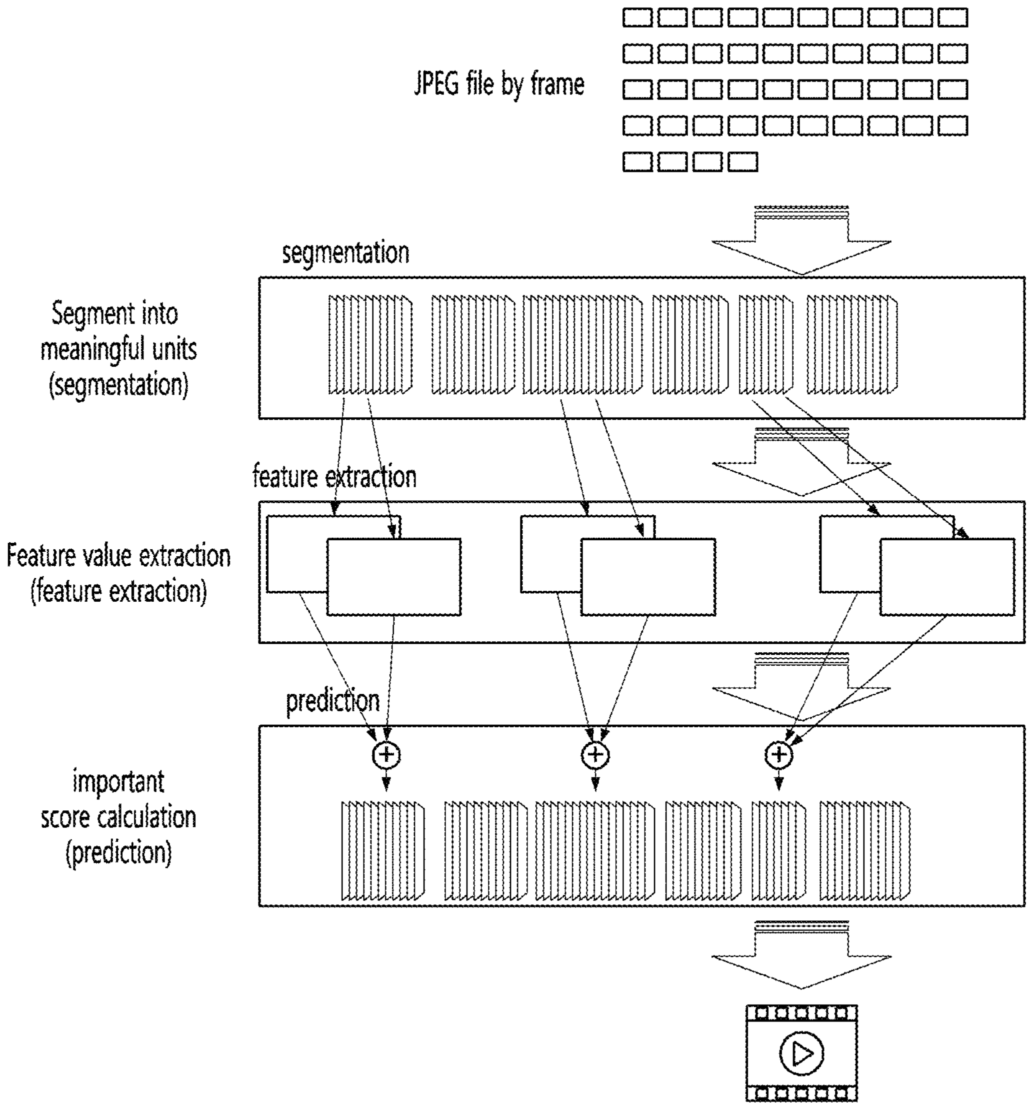
FIG. 7 is a diagram schematically illustrating a technology for generating abbreviated content by a display device according to an embodiment of the present disclosure.

FIG. 7 is a drawing schematically illustrating a technology for generating abbreviated content by a display device according to an embodiment of the present disclosure.

The controller 170 can generate abbreviated content composed of only scenes of interest to the user by combining artificial intelligence technology and computer vision technology. In particular, the controller 170 can generate abbreviated content by extracting highlight scenes based on a DNN (Deep Neural Network) by applying an attention mechanism.

Referring to FIG. 7, controller 170 can analyze content by frame and segment the frames into predetermined units.

The controller 170 can perform feature extraction to extract feature values for each segmented unit.

The controller 170 can calculate (prediction) an importance score for each extracted feature value.

Figure 8:
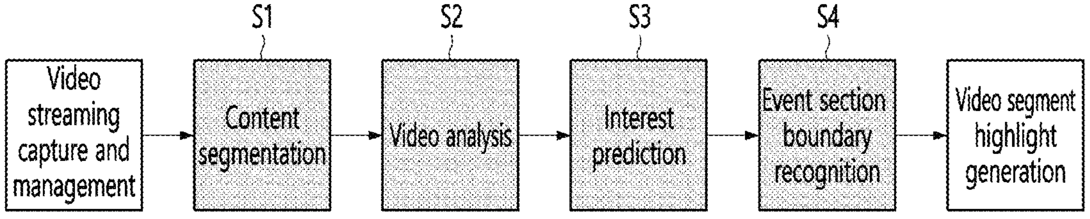
FIG. 8 is a flowchart illustrating a method for generating abbreviated content by a display device according to an embodiment of the present disclosure.

FIG. 8 is a flowchart illustrating a method for generating abbreviated content by a display device according to an embodiment of the present disclosure.

When the controller 170 does not generate abbreviated content, the controller 170 can capture and manage video streaming.

When the controller 170 initiates generation of the abbreviated content, the controller 170 can segment the content (S1).

The controller 170 can segment the content into frames for frame-by-frame video analysis as a preprocessing step for the target content corresponding to the original of the abbreviated content.

In addition, the controller 170 can detect a scene transition or measure the size of the movement in the scene in the step of segmenting the content.

After segmenting the content, controller 170 can perform video analysis (S2).

The controller 170 can detect people and specific scene as key points in generating abbreviated content.

The controller 170 can use an attention mechanism when analyzing the video.

The controller 170 can perform interest prediction after performing video analysis (S3).

The controller 170 can calculate an interest index for a detected person or a specific scene, and extract an optimal weight to quantitatively extract the importance of the corresponding frame.

The controller 170 can recognize an event section boundary (S4).

For example, the controller 170 can recognize a boundary of a section where an event occurs, such as a change in location or a change in person. The controller 170 can accurately find a meaningful feature value for object recognition through event section boundary recognition. That is, the controller 170 can recognize an important scene through temporal and spatial analysis, predict an interest index by a linear combination of feature values, and generate an abbreviated content by deleting a segmented video starting with the lowest interest index.

The controller 170 can generate abbreviated content (highlights) by connecting the remaining segmented videos after deletion.

In summary, the controller 170 can segment the frames of the original content into predetermined units, extract feature values for each segmented unit, calculate importance scores for the extracted feature values, and extract frames to be included in the abbreviated content. The controller 170 can connect the extracted frames to generate the abbreviated content. Meanwhile, the controller 170 can extract feature values from each segmented unit depending on whether an event occurs. For example, the controller 170 can extract feature values as high or low depending on whether an event occurs. The measurement of feature values as high or low depending on whether an event occurs can vary depending on the genre of the content. The controller 170 can detect changes in people, space, and time to obtain whether an event occurs. In other words, the controller 170 can detect that an event has occurred when people, space, and time change.

In this way, the generation of abbreviated content can be composed of four steps: content segmentation, video analysis, interest prediction, and event section boundary recognition.

Figure 9:
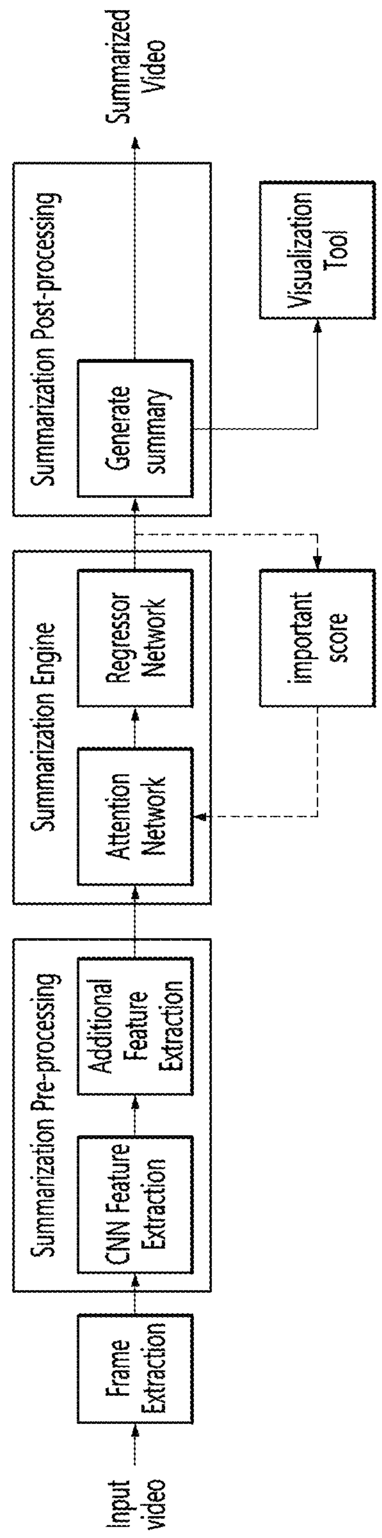
FIG. 9 is a diagram illustrating an operation method according to an attention mechanism used when a display device according to an embodiment of the present disclosure generates abbreviated content.

FIG. 9 is a diagram illustrating an operation method according to an attention mechanism used when a display device according to an embodiment of the present disclosure generates abbreviated content.

The controller 170 may include a summarization pre-processing module 1971, a summarization engine module 1973, and a summarization post-processing module 1975.

In particular, each of the summarization pre-processing module 1971, the summarization engine module 1973, and the summarization post-processing module 1975 may be a component of the content generator 197 of the controller 170, but this is merely exemplary, and thus it is reasonable that it is not limited thereto.

The summarization pre-processing module 1971 can extract the frame of target content, i.e., the frame of the input video. That is, the summarization pre-processing module 1971 can extract the processing unit in units of frames from the input video.

The summarization pre-processing module 1971 can utilize a CNN-based model to extract features for generating an abbreviated content composed of only key frames with high importance. The summarization pre-processing module 1971 can extract features for generating an abbreviated content.

In addition, the summarization pre-processing module 1971 can recognize the event occurrence time to obtain the scene change section.

The summarization pre-processing module 1971 can transfer the extracted features and the event occurrence time to the summarization engine module 1973.

The summarization engine module 1973 can extract key frames by calculating the importance score per frame by applying the attention technique. That is, the summarization engine module 1973 can calculate the importance score for each frame based on the extracted features and the event occurrence time, and extract key frames based on the calculated score. For example, the summarization engine module 1973 can extract a frame with an importance score higher than a threshold as a key frame.

That is, the summarization engine module 1973 can perform inference operations through a model learned based on labeled data.

The summarization post-processing module 1975 can generate abbreviated content (summarized video) composed of key frames.

Figure 10:
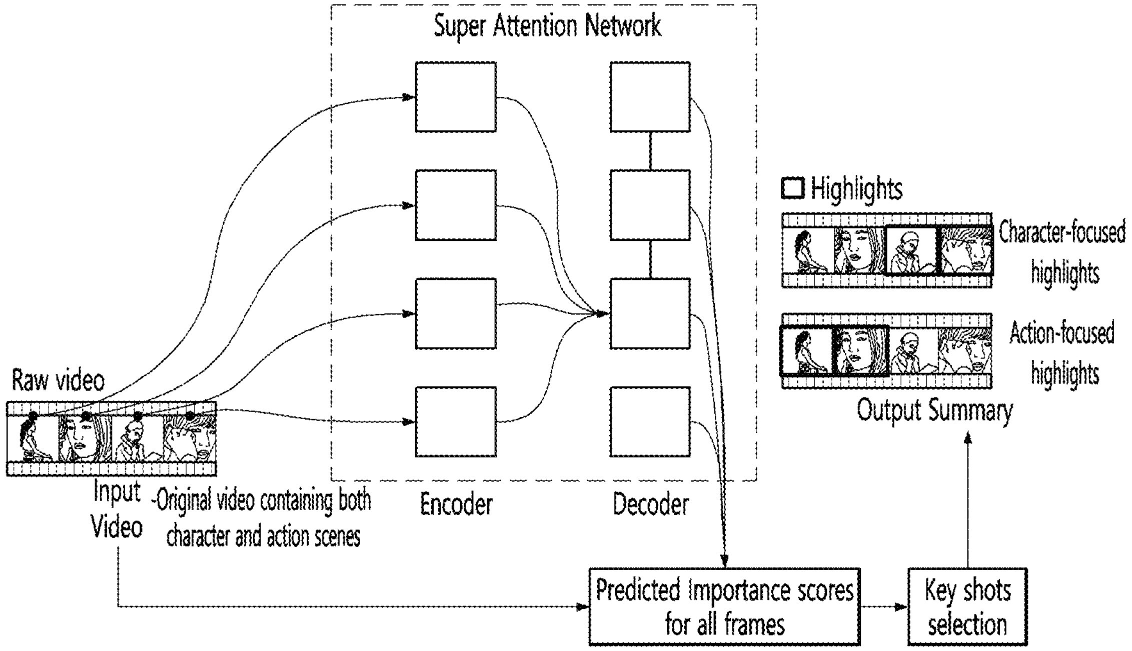
FIG. 10 is an exemplary diagram illustrating a learning model for generating abbreviated content according to an embodiment of the present disclosure.

FIG. 10 is an example diagram illustrating an abbreviated content generation learning model according to an embodiment of the present disclosure.

The abbreviated content generation learning model may be a learning model to which an Encoder-Decoder Architecture Style is applied.

In the abbreviated content generation learning model according to an embodiment of the present disclosure, an attention mechanism may be composed of an encoder and a decoder.

The encoder may continuously input frames and output a context vector with weights reflected as a result, and may calculate an importance score for selecting frames to be included in the abbreviated content.

The decoder can receive a context vector with weights reflected from the encoder. The decoder can intensively learn the region to select key shots according to the context vector. Here, a shot is a set of consecutive frames, and a key shot can be a set of consecutive frames to be included in the abbreviated content.

The controller 170 can refer to the entire frame in the encoder again at each time step when predicting the output frame in the decoder by applying this attention mechanism. In particular, the controller 170 can recheck the input frames related to the frame to be predicted at that time, rather than referring to all of the entire input frames at the same rate.

This attention mechanism can be formed as a function with a data type consisting of key values.

Figure 11:
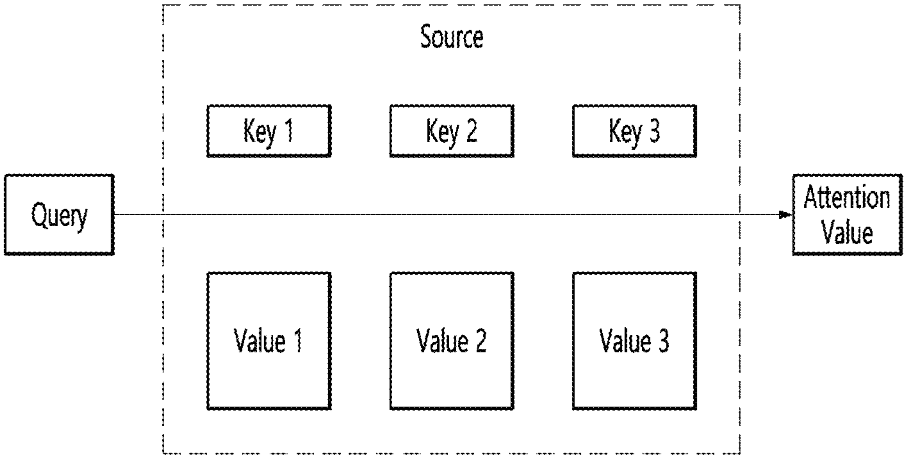
FIG. 11 is a diagram illustrating an example of an attention function according to an embodiment of the present disclosure.

FIG. 11 is a diagram illustrating an example of an attention function according to an embodiment of the present disclosure.

The attention function may be a dictionary data type, which is a data type consisting of Key-Value. It consists of two pairs, a Key and a Value, and thus, a value mapped through a key can be found.

The controller 170 can obtain an Attention Value through the attention function.

Through the attention function, the encoder obtains only a portion of the video that affects the result, not the entire area of the video, and the decoder processes only the portion of the obtained area, so there is an advantage of efficient video processing.

Figure 12:
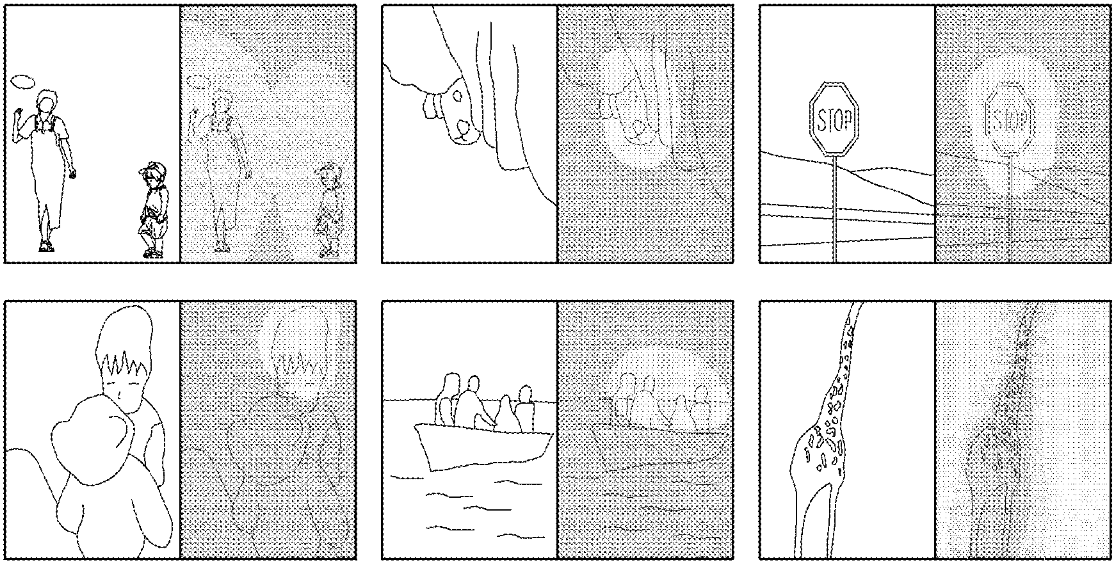
FIG. 12 is an exemplary diagram illustrating a specific region being extracted from an actual video through an attention mechanism according to an embodiment of the present disclosure.

FIG. 12 is an example drawing showing a specific region being extracted from an actual video through an attention mechanism according to an embodiment of the present disclosure.

Referring to the example of FIG. 12, for each of the six example frames, an image is shown in which the original frame and the region extracted by attention from the original frame are highlighted. That is, referring to the example of FIG. 12, it is possible to confirm a method in which the controller 170 extracts a frame including a region of a person, an animal, a sign, etc., i.e., a region extracted by attention, through the attention mechanism.

Figure 13:
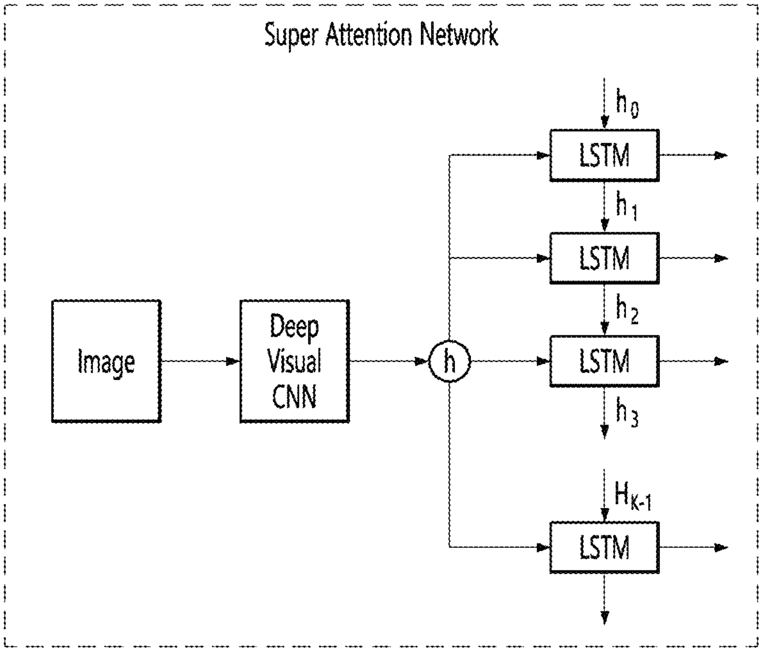
FIG. 13 is a diagram illustrating a relationship diagram between attention and an LSTM hidden state according to an embodiment of the present disclosure.

FIG. 13 is a drawing showing a relationship between attention and an LSTM hidden state according to an embodiment of the present disclosure.

The controller 170 extracts features from each frame extracted from the target content through a CNN network, and the features extracted in this way can affect the LSTM having hidden states of $h_0$, $h_1$, . . . , $h_{k-1}$, which are divided into k parts by the attention influence h.

The controller 170 can input a frame sequence and calculate importance scores for selecting frames to be included in the abbreviated content through a CNN network. The controller 170 can intensively train an area for selecting key shots in the LSTM where the weights are calculated based on the calculated importance scores.

The controller 170 can generate abbreviated content by connecting key shots obtained by the above-described method in the final stage of the decoder.

Meanwhile, the display device 100 according to an embodiment of the present disclosure can recommend abbreviated content generated by recognizing the user's viewing situation.

According to one embodiment, the controller 170 may learn a model of the user's viewing situation awareness.

Specifically, in step S13 of FIG. 6, the controller 170 can acquire the model of the user's viewing situation awareness by learning the user's preference and viewing pattern. Accordingly, the controller 170 can recognize the channel change point and recommend abbreviated content based on the content information of the changed channel.

If the changed channel through the pre-learned model is a user's preferred content, the controller 170 can recommend abbreviated content of the corresponding content. The controller 170 can recommend abbreviated content such as the same content as the content of the changed channel, content of the same genre, or content with the same person.

For example, if the 8th inning of a baseball game between Team A and Team B is being broadcast on the changed channel, the controller 170 can recommend abbreviated content for the 1st to 7th innings of the previous game.

As another example, if the second half of a soccer match between countries A and B is being broadcast on the changed channel, the controller 170 may recommend an abbreviated content for the previous first half broadcast.

As another example, if news is being broadcast on the changed channel, the controller 170 may recommend an abbreviated content for the latest news.

As another example, if a drama is being broadcast on the changed channel, the controller 170 may recommend an abbreviated content for the previous episode of the drama. That is, if episode 12 of drama A is being broadcast on the changed channel, the controller 170 may recommend an abbreviated content that summarizes episodes 1 to 11.

According to another embodiment, the controller 170 may recommend an abbreviated content based on a user's channel change input.

Figure 14:
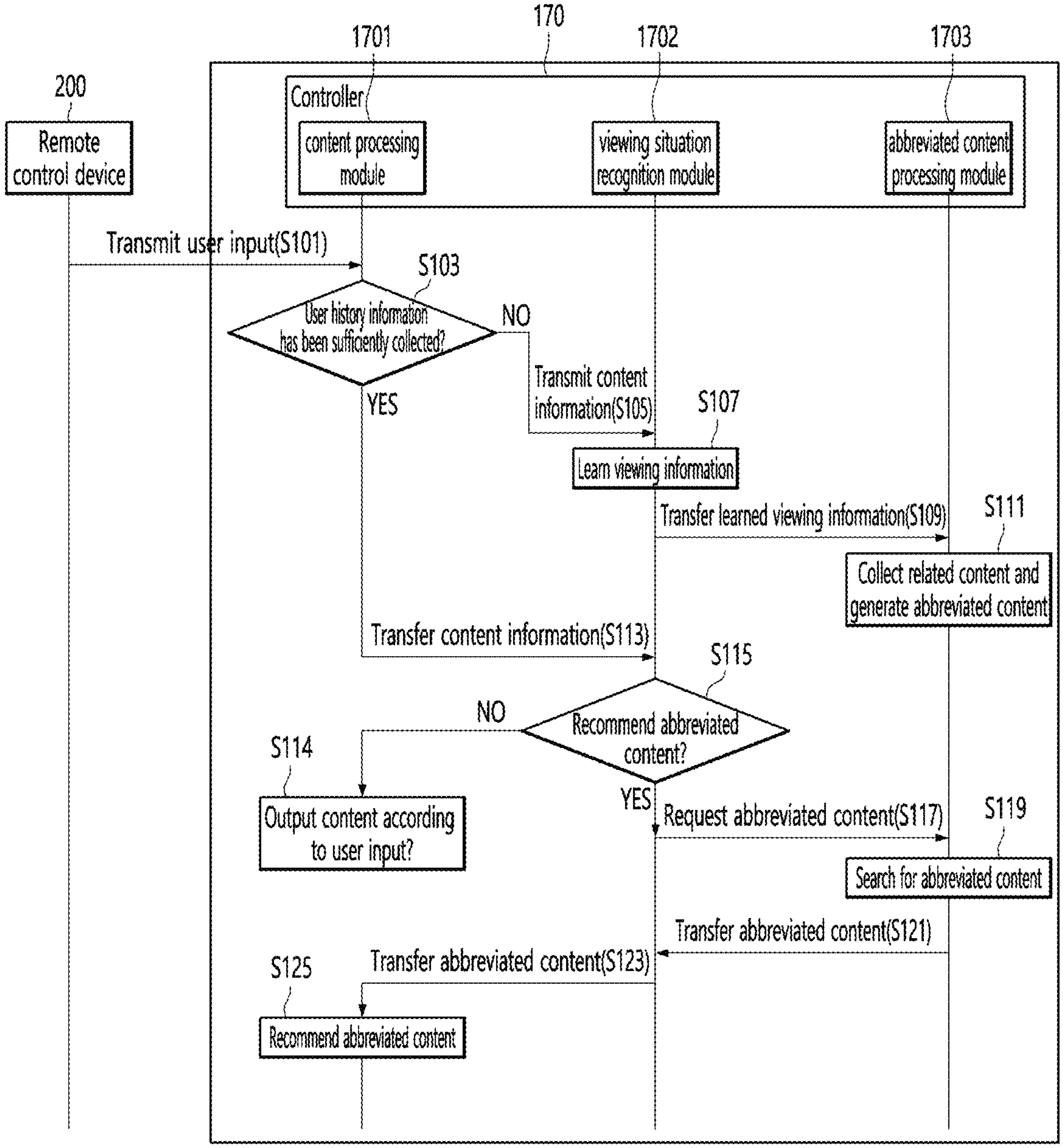
FIG. 14 is a flowchart illustrating a method for a display device according to a first embodiment of the present disclosure to recommend abbreviated content based on a user's channel change input.

FIG. 14 is a flowchart illustrating a method for recommending abbreviated content based on a user's channel change input by a display device according to the first embodiment of the present disclosure.

In FIG. 14, the controller 170 is divided into a content processing module 1701, a viewing situation recognition module 1702, and an abbreviated content processing module 1703, but this is only for convenience of explanation, and it is reasonable that it is not limited thereto.

The controller 170 can receive a user input from a remote control device 200 (S101).

The user input may be an input for changing a channel. For example, the user input may be a channel up/down input or a channel number input.

When the content processing module 1701 receives a user input, it can determine whether the user history information has been sufficiently collected (S103).

That is, the controller 170 can obtain the recommendation timing of the abbreviated content depending on whether the user history information required for obtaining the user preference is stored in the memory 140 in a size larger than the preset criteria size.

Specifically, the content processing module 1701 can determine whether the user history information is stored in the memory 140 in a size larger than the preset criteria size. If the size of the user history information stored in the memory 140 is larger than the preset criteria size, the content processing module 1701 can determine that the user history information has been sufficiently collected. And, if the size of the user history information stored in the memory 140 is smaller than the preset criteria size, the content processing module 1701 can determine that the user history information has not been sufficiently collected.

Meanwhile, the controller 170 can determine whether user history information has been sufficiently collected for each user. The display device 100 can be equipped with a camera (not shown) to distinguish the user currently viewing. In addition, the display device 100 may distinguish user history information by user and store it in the memory 140. Accordingly, the controller 170 can recognize the user currently viewing the content and determine whether the user history information for the user currently viewing the content has been sufficiently collected.

If the content processing module 1701 has not sufficiently collected the user history information, it can transmit the content information to the viewing situation recognition module 1702 (S105).

The viewing situation recognition module 1702 can learn the viewing information based on the transmitted content information (S107).

The viewing situation recognition module 1702 can transfer learned viewing information to the abbreviated content processing module 1703 (S109).

The abbreviated content processing module 1703 can collect related content and generate abbreviated content based on the learned viewing information (S111).

That is, the abbreviated content processing module 1703 can collect related content that is estimated to be preferred content by the user based on the learned viewing information and generate abbreviated content by summarizing the collected related content.

Meanwhile, if the content processing module 1701 has sufficiently collected user history information, it can transfer content information to the viewing situation recognition module 1702 (S113).

That is, if the content processing module 1701 sufficiently collects user history information, it can transmit content information to the viewing situation recognition module 1702 to provide abbreviated content according to the content of the channel changed according to the user input.

If the viewing situation recognition module 1702 receives content information, it can determine whether to recommend the abbreviated content (S115).

The viewing situation recognition module 1702 can determine whether to recommend the abbreviated content based on the received content information.

For example, the viewing situation recognition module 1702 can determine whether the abbreviated content according to the received content information is stored or whether the abbreviated content according to the received content information can be generated. The viewing situation recognition module 1702 can determine to recommend the abbreviated content if the abbreviated content is stored or can be generated.

If the viewing situation recognition module 1702 determines not to recommend abbreviated content, it can output content according to user input (S114).

If the viewing situation recognition module 1702 determines to recommend abbreviated content, it can request the abbreviated content processing module 1703 for the abbreviated content (S117).

When the abbreviated content processing module 1703 receives a request for abbreviated content, it can search for the abbreviated content (S119).

The abbreviated content processing module 1703 can search for the abbreviated content based on the content information (S119).

According to an embodiment, if there is no abbreviated content pre-stored in the memory 140, the abbreviated content processing module 1703 can generate the abbreviated content based on the content information.

Meanwhile, the controller 170 can recommend the abbreviated content related to the content displayed on the changed channel according to the user input. If a sports game is being broadcast on the changed channel, the controller 170 can recommend the abbreviated content that summarizes the previous content of the sports game being broadcast. For example, if the second half of a soccer game is being broadcast on the changed channel, controller 170 may recommend an abbreviated content summarizing the first half of the soccer game. If the news is being broadcast on the changed channel, controller 170 may recommend an abbreviated content summarizing the latest news. The controller 170 may recommend abbreviated content for the same content, content with the same genre, or content with the same person as the content displayed in the changed channel.

The abbreviated content processing module 1703 can transfer the abbreviated content to the viewing situation recognition module 1702 (S121).

The viewing situation recognition module 1702 can transfer the abbreviated content received from the abbreviated content processing module 1703 to the content processing module 1701 (S123).

The content processing module 1701 can recommend the received abbreviated content (S125).

Figure 15:
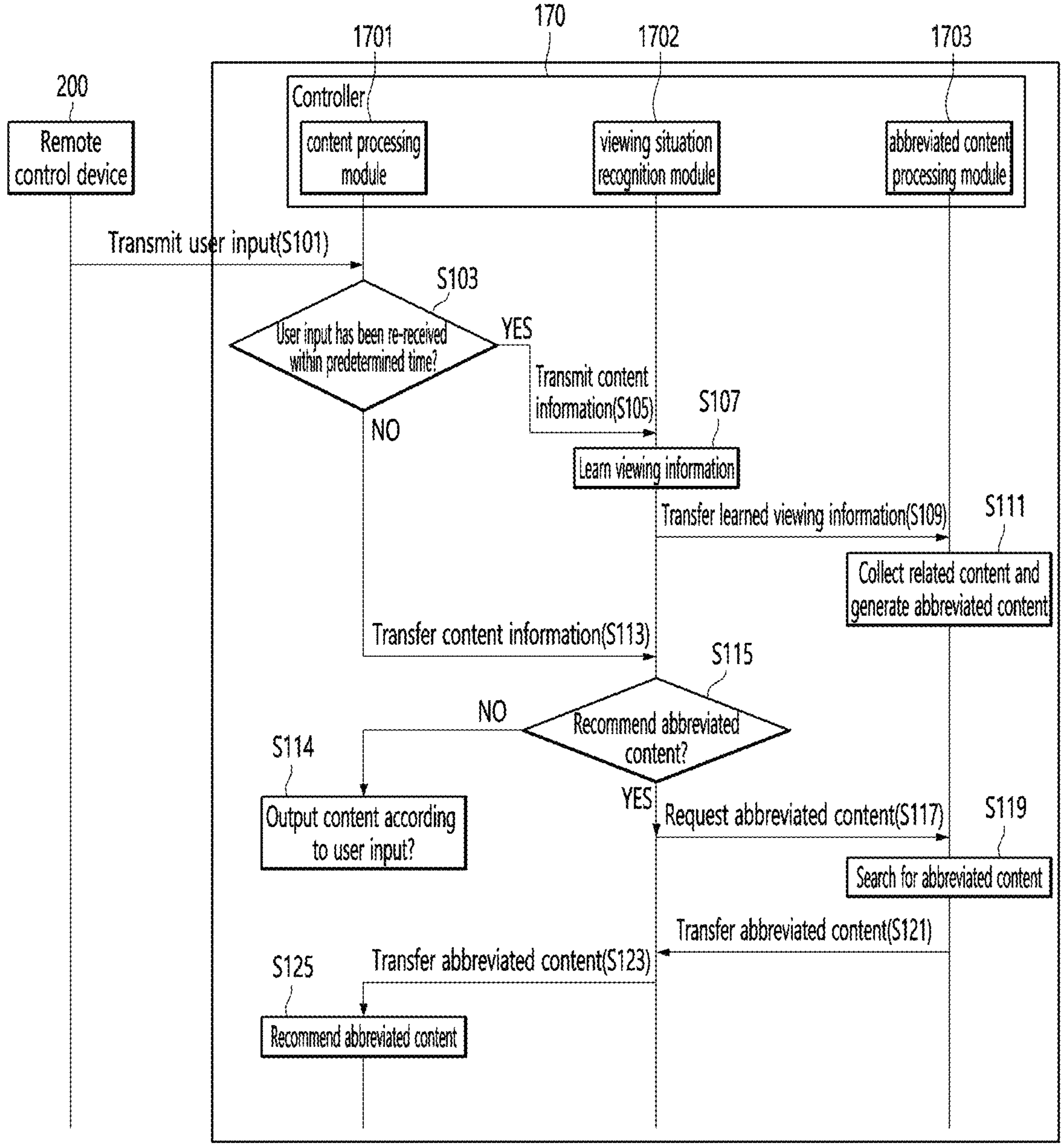
FIG. 15 is a flowchart illustrating a method for a display device according to a second embodiment of the present disclosure to recommend abbreviated content based on a user's channel change input.

FIG. 15 is a flowchart illustrating a method for recommending abbreviated content based on a user's channel change input by a display device according to the second embodiment of the present disclosure.

The method for recommending abbreviated content according to FIG. 15, that is, the method for recommending abbreviated content according to the second embodiment, may differ only in step S103 from the method for recommending abbreviated content according to FIG. 14 (the method for recommending abbreviated content according to the first embodiment). Therefore, redundant descriptions will be omitted, and step S103 will be described in detail herein.

When the content processing module 1701 receives a user input, it can determine whether the user input has been re-received within a predetermined time (S103).

That is, when the controller 170 receives the user input and re-receives the user input within a predetermined time, it can recommend the abbreviated content.

Specifically, the content processing module 1701 can count the time until the next user input is received after receiving the user input. The content processing module 1701 can compare the counted time with a predetermined time to determine whether the user input was received again within the predetermined time.

If the content processing module 1701 determines that the user input has been re-received within a predetermined time, it may determine that the user is in a state where he or she cannot find content to watch, and may want to recommend abbreviated content.

Accordingly, if the content processing module 1701 determines that the user input has been re-received within a predetermined time, it may transmit content information to the viewing situation recognition module 1702, and the viewing situation recognition module 1702 may determine whether to recommend the abbreviated content and recommend the abbreviated content.

Meanwhile, if the content processing module 1701 determines that the user input has not been re-received within a predetermined time, it may determine that the user is in a state where he or she is watching content according to the user input and may not recommend the abbreviated content. Instead, if the content processing module 1701 determines that the user input has not been re-received within a predetermined time, it may transmit information on the content that the user is watching, and by learning the viewing information, it may generate the abbreviated content.

In summary, in each of step S103 of FIG. 14 and FIG. 15, if the controller 170 does not recommend abbreviated content, it can learn user preferences based on information about content displayed according to user input.

On the other hand, since abbreviated content is generated by combining specific frames extracted from the original content, some frames may have a disconnection problem in which they are not connected to the next frame. That is, some frame may be connected to frame A in the original content, but may be connected to frame B in the abbreviated content, and in this process, a disconnection problem may occur in which the flow of the content is cut-off. As an example of the disconnection problem, when playing the abbreviated content, the dialogue of the character may be disconnected due to the disconnection of frames, and a problem may occur in which the transition to a different scene occurs suddenly.

Therefore, the present disclosure aims to provide a display device that generates abbreviated content with minimized disconnection problems. The present disclosure prevents disconnected frames from being included when generating the abbreviated content.

Figure 16:
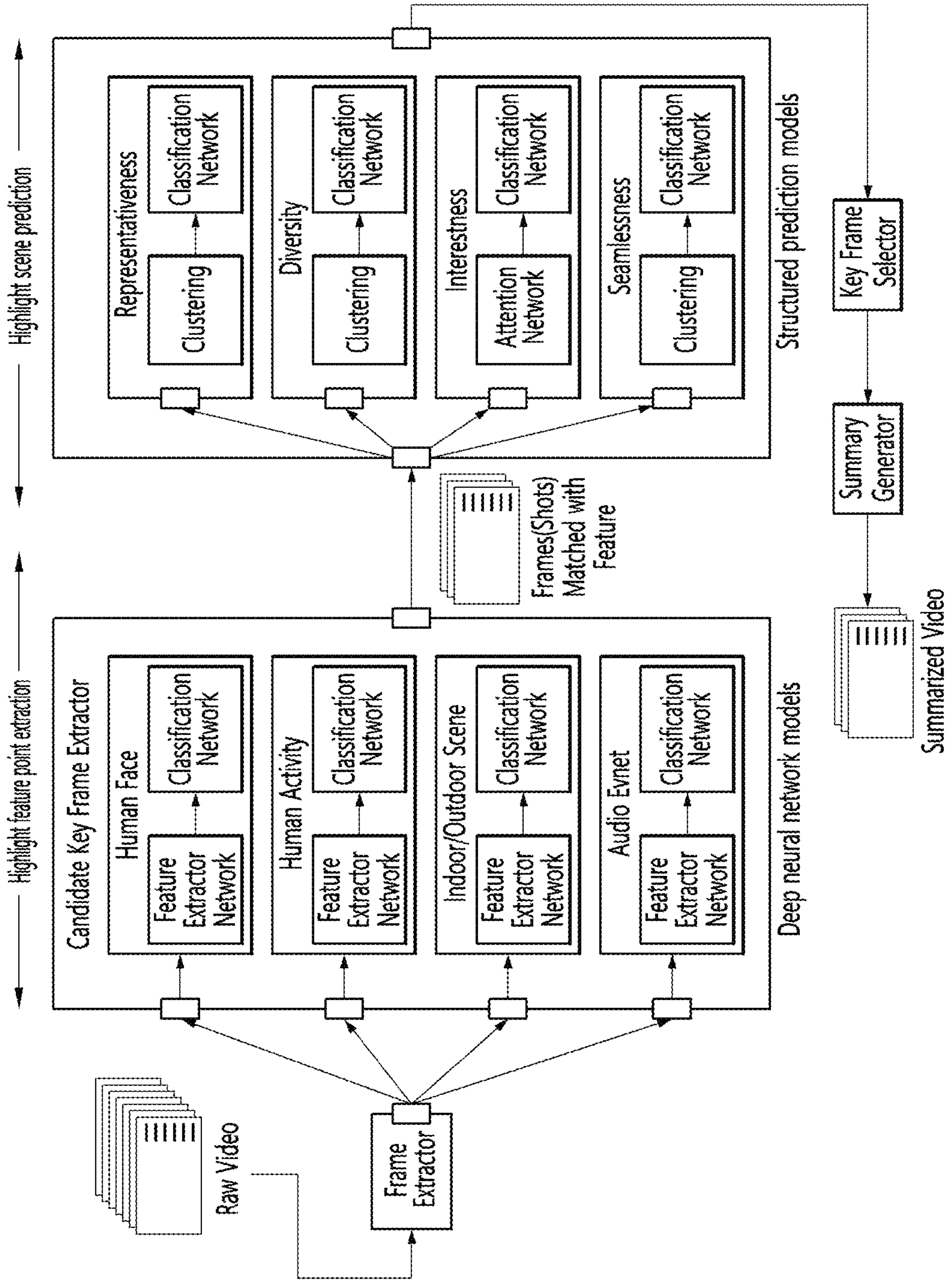
FIG. 16 is a diagram illustrating a SW structure diagram for a display device according to an embodiment of the present disclosure to generate abbreviated content.

FIG. 16 is a diagram illustrating a SW structure diagram for generating abbreviated content by a display device according to an embodiment of the present disclosure.

Referring to FIG. 16, the prerequisite software (SW) for generating abbreviated content may be composed of a highlight feature point extraction step and a highlight scene prediction step. When original content is input, the controller 170 may divide the raw video of the original content into frame units.

In the first step, the highlight feature point extraction step, the controller 170 can obtain a frame matching the user's preference from among the segmented frames. Specifically, the controller 170 can apply various feature point extraction techniques so that abbreviated content can be produced according to the user's various requirements and personal taste, and can extract at least one frame to be included in the abbreviated content through the application of such feature point extraction techniques. The frame extracted in the first step may be a Candidate Key Frame. The candidate key frame may be a frame primarily extracted to obtain a key frame included in the abbreviated content.

In the first stage, the controller 170 can obtain a candidate key frame based on at least one of a human face, a human activity, an indoor/outdoor scene, and an audio event.

In the second stage, the highlight scene prediction stage, the controller 170 can obtain a final key frame based on properties (e.g., representativeness, diversity, interest, seamlessness, etc.) that can be judged as highlights among the frames extracted in the previous stage. The final key frame may be a secondarily extracted frame to be included in the actual abbreviated content. The final key frame may or may not belong to the candidate key frame.

In the second stage, the controller 170 can obtain a final key frame among the candidate key frames based on various properties including representativeness, diversity, interestness, and seamlessness. Hereinafter, the method of obtaining key frames for securing non-discontinuity in abbreviated content by controller 170 is described in detail. The controller 170 can obtain frames for generating abbreviated content in which both audio and video are non-discontinuous.

Figure 17:
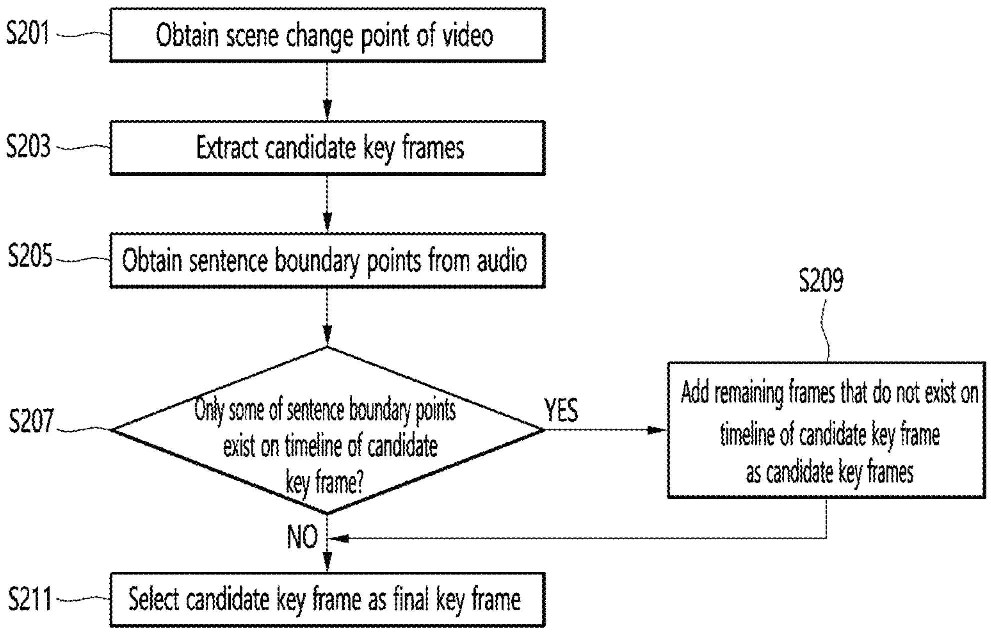
FIG. 17 is a flowchart illustrating a method for a display device according to an embodiment of the present disclosure to obtain frames for securing non-discontinuity.

FIG. 17 is a flowchart illustrating a method for obtaining frames for securing non-discontinuity of a display device according to an embodiment of the present disclosure.

In order to prevent AV discontinuity, the controller 170 may select a video by referring to whether a sentence boundary point, which is an audio property, is included, and may also apply a cross-reference model that refers to audio selection by referring to a scene change point of the video. This will be described in detail below with reference to FIG. 17.

The controller 170 may obtain a scene change point of the video (S201).

The controller 170 may analyze the video to obtain a scene change point. The controller 170 may obtain a scene change point by calculating an importance score per frame.

Figure 18:
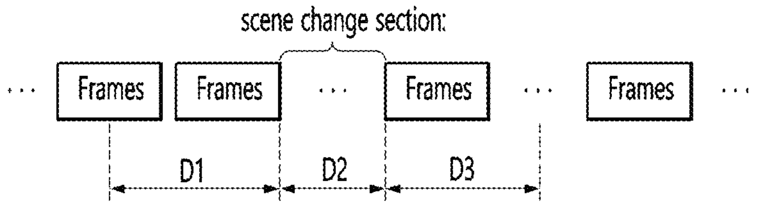
FIG. 18 is a diagram illustrating a method for a display device according to an embodiment of the present disclosure to obtain a scene change point.

FIG. 18 is a drawing explaining a method for a display device according to an embodiment of the present disclosure to obtain a scene change point.

The controller 170 can segment frames into sections of predetermined units. For example, the controller 170 can segment frames at predetermined time intervals. In the example of FIG. 18, only frames divided into the first to third sections (D1) (D2) (D3) are illustrated, but this is only partially illustrated for convenience of explanation, and thus it is reasonable that the present invention is not limited thereto.

The controller 170 can calculate frame level scores of frames included in each section. In the example of FIG. 18, the controller 170 can calculate frame level scores of each of the frames in the first to third sections (D1) (D2) (D3).

The controller 170 can obtain a scene change point based on the frame level scores. For example, controller 170 can obtain scene change points based on statistical figures for frame level scores.

Meanwhile, in FIG. 9, it was described that key frames are extracted directly based on the importance score calculated for each frame, but in the embodiment according to FIG. 17, candidate key frames can be extracted first based on the scene change point according to the frame level score.

The scene change point may mean including the scene change section.

Again, FIG. 17 will be described.

The controller 170 can extract candidate key frames based on the scene change point (S203).

The candidate key frames may be the same as those described in FIG. 16.

After obtaining the candidate key frames, the controller 170 can obtain sentence boundary points from the audio (S205).

The audio may include voice, background music, sound effects, etc. The controller 170 can obtain the boundary points of sentences in which at least one voice included in the audio is spoken.

In order to select scene change points based on the start and end of complete sentences in terms of audio, the controller 170 can obtain sentence boundary points from the audio.

According to one embodiment, the controller 170 can obtain boundary points of sentences related to candidate key frames in audio. Here, the sentences related to the candidate key frames may be sentences that are at least partially uttered in the playback section of the candidate key frames, but this is merely exemplary and therefore is not limited thereto.

According to another embodiment, the controller 170 can obtain boundary points of each of all sentences included in the audio of the original content.

According to another embodiment, the controller 170 can obtain boundary points of sentences that include a specific keyword in the audio of the original content. Here, the specific keyword may be determined differently for each content through audio analysis or may be preset regardless of the content.

As described above, the controller 170 can obtain boundary points of at least one sentence in the audio through various embodiments.

Meanwhile, the method by which controller 170 obtains the boundary points of a sentence is explained with reference to FIG. 19.

Figure 19:
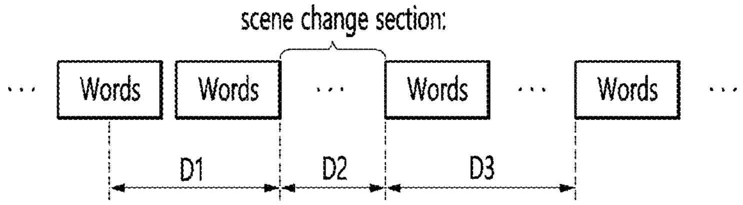
FIG. 19 is a diagram illustrating a method for a display device according to an embodiment of the present disclosure to obtain a sentence boundary point.

FIG. 19 is a drawing explaining a method for a display device according to an embodiment of the present disclosure to obtain boundary points of a sentence.

The controller 170 may obtain a boundary point of at least one sentence by analyzing audio of each segment (D1) (D2) (D3) segmented as described in FIG. 18. Alternatively, the controller 170 may obtain a boundary point of at least one sentence by analyzing audio without a separate section segment.

For example, the controller 170 may recognize a combination of words continuously spoken within a predetermined time (e.g., 500 ms) in audio as a sentence.

The sentence boundary point may include a start point of the sentence and an end point of the sentence.

The controller 170 may obtain a start point and an end point of at least one sentence by analyzing a voice included in the audio. Specifically, the controller 170 can obtain a start point and an end point of at least one sentence based on at least one of a pitch, energy, and speech rate of a voice included in audio.

The controller 170 can determine a point where no consecutive words exist for a predetermined time period, determined based on statistical values for at least one of pitch, energy, and speech rate, as a boundary point of a sentence. Here, the meaning of being based on the statistical values may include the meaning of being based on data learned as the start point and end point of the sentence are input for various audios, but this is only an example and is not limited thereto.

In summary, the controller 170 can determine a point where there are no consecutive words for a predetermined time based on at least one of pitch, energy, and speech rate as a boundary point between sentences, i.e., a boundary point of an independent sentence.

Again, FIG. 17 is described.

The controller 170 can determine whether only some of the sentence boundary points exist on the timeline of the candidate key frame (S207).

That is, the controller 170 can determine whether only one of the start point and the end point of the sentence exists on the timeline of the candidate key frame. Specifically, the controller 170 can determine whether the start point of the sentence exists on the timeline of the candidate key frame and the end point of the sentence does not exist on the timeline of the candidate key frame. Or, the controller 170 can determine whether the end point of the sentence exists on the timeline of the candidate key frame and the start point of the sentence does not exist on the timeline of the candidate key frame.

The timeline of the candidate key frame may mean the playback section of the candidate key frame.

If only some of the sentence boundary points exist on the timeline of the candidate key frame, the controller 170 can add the remaining frames that do not exist on the timeline of the candidate key frame as candidate key frames (S209).

Specifically, the controller 170 can add the remaining frames between the sentence boundary points that do not exist on the timeline of the candidate key frame and the playback section of the candidate key frame as candidate key frames, if only some of the sentence boundary points exist on the timeline of the candidate key frame. That is, the controller 170 can add the frames between the candidate key frame and the end point of the sentence as candidate key frames, if only the start point of the sentence exists on the timeline of the candidate key frame. Similarly, the controller 170 can add the frames between the start point of the sentence and the candidate key frame as candidate key frames, if only the end point of the sentence exists on the timeline of the candidate key frame.

If only some of the sentence boundary points exist on the timeline of the candidate key frame, the controller 170 can add the remaining frames that do not belong to the candidate key frame among the frames corresponding to the sentence as the candidate key frame.

The controller 170 can select the extracted or added candidate key frame as the final key frame (S211).

That is, if the controller 170 adds the candidate key frame, both the candidate key frame extracted in step S203 and the candidate key frame added in step S209 can be selected as the final key frame.

In addition, if the controller 170 determines that all of the sentence boundary points exist on the timeline of the candidate key frame in step S207, the controller 170 can select the candidate key frame extracted in step S203 as the final key frame.

Figure 20:
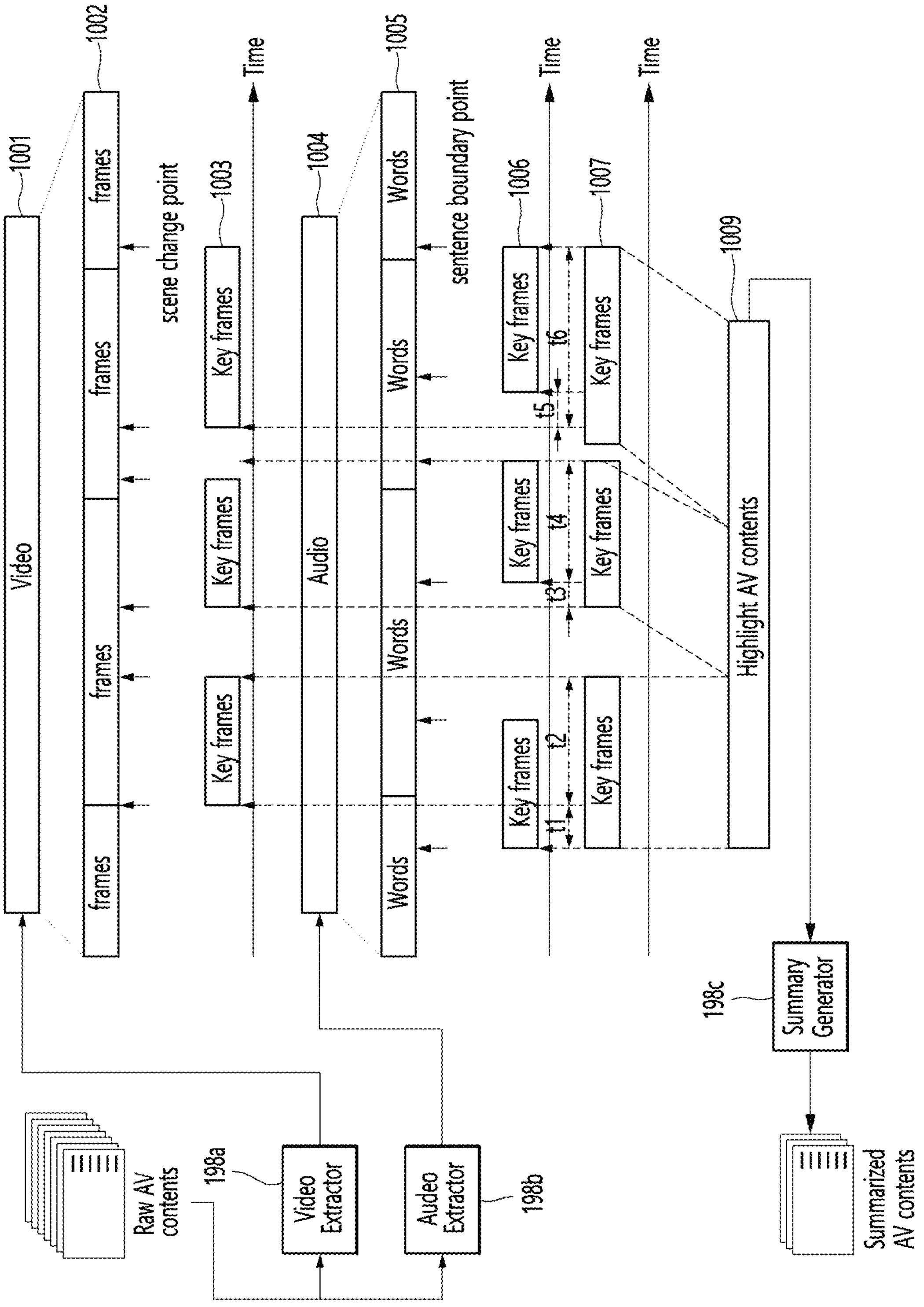
FIG. 20 is a diagram illustrating a method for a display device according to an embodiment of the present disclosure to select a final key frame based on video and audio.

FIG. 20 is a diagram explaining a method for a display device according to an embodiment of the present disclosure to select a final key frame based on video and audio.

The video extractor 198*a*, the audio extractor 198*b*, and the abbreviated content generator 198*c* illustrated in FIG. 20 may be included in the content generator 197 described in FIG. 5. That is, the video extractor 198*a*, the audio extractor 198*b*, and the abbreviated content generator 198*c* may be a component of the content generator 197.

The content collector 195 can receive content from the network interface 133. In addition, the content collector 195 can receive content from the tuner 131. The received content can be Raw AV content.

The video extractor 198*a* can extract video 1001 from the received content, and the audio extractor 198*b* can extract audio 1004 from the received content. The abbreviated content generator 198*c* can generate abbreviated content by combining frames obtained based on the extracted video 1001 and frames obtained based on the extracted audio 1004.

The controller 170 can segment the extracted video 1001 into frame units to obtain a plurality of frames 1002. The controller 170 can analyze the plurality of frames 1002 to obtain scene change point. Arrows displayed on the plurality of frames 1002 can indicate scene change point.

The controller 170 can obtain at least one candidate key frame 1003 based on the scene change points.

In addition, the controller 170 can obtain words from audio and recognize sentences based on the obtained words. The controller 170 can recognize sentences by obtaining at least one sentence boundary point. Arrows displayed on the plurality of words 1005 can indicate sentence boundary points.

The controller 170 can obtain at least one candidate key frame 1006 based on the sentence boundary point.

For convenience of explanation, a candidate key frame 1003 extracted based on the video of the content may be named a first frame, and a candidate key frame 1006 extracted based on the audio of the content may be named a second frame.

The controller 170 can generate an abbreviated content 1009 by combining the first frames 1003 and the second frames 1005. The controller 170 can generate an abbreviated content 1009 by combining the first frames 1003 and the second frames 1005 in time order so that they are played continuously.

In addition, an overlapping frame among the first frames 1003 and the second frames 1005 can be included in the abbreviated content 1009 only once. That is, the controller 170 can generate an abbreviated content 1009 by complementing one of the first frames 1003 and the second frames 1006 with the other. For example, the controller 170 can extract the second frames 1006 so that the sentences spoken in the playback section of the first frames 1003 do not break. After extracting the first frames 1003, the controller 170 can extract frames to which the sentences spoken in the playback section of the first frames 1003 belong in addition to the first frames 1003 as the second frames 1006.

The controller 170 can segment the frames of the content into predetermined units, extract feature value for each segmented unit, and calculate importance scores for the extracted feature value to extract the first frames 1003. The controller 170 can detect a scene transition point based on the video, and obtain the first frames 1003 based on the detected scene transition point. The controller 170 can detect a scene transition point by detecting a change in a person, space, or time.

And, the controller 170 can extract second frames 1006 using the start point and end point of each sentence included in the audio.

Specifically, if a sentence in which only one of the start point and the end point of the sentence exists in the playback section of the first frames 1003 is detected, the controller 170 can extract the frames of the section in which the entire detected sentence is played as the second frames. For example, if only the end point of the sentence exists in the t2 playback section of the first frames 1003, the controller 170 can extract the frames of the section in which the entire detected sentence is played as the second frames 1006. In the example of FIG. 20, the frames including the t1 playback section can be extracted as the second frames 1006.

Meanwhile, the controller 170 can extract the second frames 1006 based on whether the playback section of the first frames 1003 matches the playback section of the sentence obtained based on audio after extracting the first frames 1003. For example, the controller 170 may extract frames in a section that does not belong to the playback section of the first frames 1003 among the playback sections of the sentence as the second frames 1006. That is, referring to the example of the t1 and t2 playback sections of FIG. 20, the controller 170 may extract only the frames 1006 corresponding to the t1 playback section as the second frames 1006.

Meanwhile, the controller 170 may extract keywords from audio and extract the second frames based on the sentences that include the extracted keywords.

Accordingly, the controller 170 can generate an abbreviated content 1009 by adding predetermined frames, particularly second frames 1006 calculated based on audio, before/after the first frames 1003 so that there is no interruption in the sentences spoken in the playback section of the first frames 1003.

That is, the controller 170 can select a frame corresponding to at least one of the first frames 1003 and the second frames 1006 as a final key frame 1007 and generate an abbreviated content 1009 in which the final key frames 1007 are played continuously.

Referring to the example of FIG. 20, the frames of the t1 playback section, the t2 playback section, the t3 playback section, the t4 playback section, the t5 playback section, and the t6 playback section are selected as the final key frames 1007, and an abbreviated content 1009 can be generated in which the final key frames 1007 are played sequentially in time order.

In summary, the display device 100 according to the embodiment of the present disclosure determines whether a sentence boundary point, which is an audio property, exists in the playback section of a candidate key frame selected based on a scene change point of a video so as to minimize the discontinuity of the abbreviated AV content, and if all the sentence boundary points exist in the playback section of the candidate key frame, the corresponding candidate key frame is selected as the final key frame, and if all the sentence boundary points do not exist in the playback section of the candidate key frame, an additional key frame is selected from the corresponding original content, so that even if the frame is not selected in the video aspect, a discontinuity problem in the audio aspect can be prevented by adding a frame.

That is, the display device 100 according to the embodiment of the present disclosure selects candidate key frames based on scene change points obtained through video analysis, and further selects frames corresponding to boundary sentence periods including start points and end points of sentences in terms of audio, thereby generating abbreviated content with high completeness.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device, comprising:

a controller configured to receive content, and generate an abbreviated content of the received content; and a display configured to display the abbreviated content, wherein the controller is configured to:

generate the abbreviated content including first frames extracted based on video of the content and second frames extracted based on audio of the content, extract a keyword from the audio, and extract the second frames based on a sentence that includes the extracted keyword, wherein the keyword is determined differently for each content, wherein the controller is further configured to:

obtain a user viewing situation, input the obtained user viewing situation into a model for determining a recommendation timing of the abbreviated content, and recommend the abbreviated content if an output of the model indicates the recommendation timing of the abbreviated content, wherein the model has learned the recommendation timing of the abbreviated content based on user viewing patterns, wherein the user viewing patterns includes a first viewing time zone of a sport genre content, a second viewing time zone of a news genre content and a third viewing time zone of a drama genre content, and wherein the controller is further configured to:

if the user viewing situation changes to a channel with a sports match during the first viewing time zone, recommend the abbreviated content for the sports match from a start of the sports match to a present, if the user viewing situation changes to a news channel during the second viewing time zone, recommend the abbreviated content for a latest news, and if the user viewing situation changes to a drama broadcast during the third viewing time zone, recommend the abbreviated content for previous episodes of the drama broadcast.

2. The display device of claim 1, wherein the controller is configured to extract the second frames so that a sentence spoken in a playback section of the first frames does not break.

3. The display device of claim 1, wherein the controller is configured to extract, in addition to the first frames, frame to which a spoken sentence belongs during a playback section of the first frames as the second frames.

4. The display device of claim 1, wherein the controller is configured to extract the second frames using a start point and an end point of each sentence included in the audio.

5. The display device of claim 4, wherein the controller is configured to extract frames of a section in which an entire detected sentence is reproduced as the second frames when a sentence having only one of the start point and the end point is detected in a playback section of the first frames.

6. The display device of claim 4, wherein the controller is configured to obtain the start point and the end point of each sentence by analyzing a voice included in the audio.

7. The display device of claim 6, wherein the controller is configured to obtain the start point and the end point of each sentence based on at least one of pitch, energy, and speech rate of the voice included in the audio.

8. The display device of claim 4, wherein the controller is configured to recognize a combination of words continuously spoken within a predetermined time in the audio as the sentence, and obtain the start point and the end point of the sentence.

9. The display device of claim 1, wherein the controller is configured to extract the first frames by segmenting frames of the received content into predetermined units, extracting a feature value for each segmented unit, and calculating an importance score for the extracted feature value.

10. The display device of claim 1, wherein the controller is configured to extract the second frames based on whether a playback section of the first frames matches a playback section of a sentence obtained based on the audio after extracting the first frames.

11. The display device of claim 10, wherein the controller is configured to extract frames in a section that does not belong to the playback section of the first frames during the playback section of the sentence as the second frames.

12. The display device of claim 1, wherein the controller is configured to detect a scene transition point based on the video, and obtain the first frames based on the detected scene transition point.

13. The display device of claim 12, wherein the controller is configured to detect the scene transition point by detecting change in person, space, or time.

14. The display device of claim 1, wherein the controller comprises:

a video extractor configured to extract the video, an audio extractor configured to extract the audio, and an abbreviated content generator configured to extract the first frames and the second frames to generate the abbreviated content.

15. A method performed by a display device, the method comprising:

receiving content, and generating an abbreviated content of the received content; and displaying the abbreviated content, wherein the generated abbreviated content includes first frames extracted based on video of the content and second frames extracted based on audio of the content, wherein the method further comprises:

extracting a keyword from the audio, and extracting the second frames based on a sentence that includes the extracted keyword, wherein the keyword is determined differently for each content, wherein the method further comprises:

obtaining a user viewing situation, inputting the obtained user viewing situation into a model for determining a recommendation timing of the abbreviated content, and recommending the abbreviated content if an output of the model indicates the recommendation timing of the abbreviated content, wherein the model has learned the recommendation timing of the abbreviated content based on user viewing patterns, wherein the user viewing patterns includes a first viewing time zone of a sport genre content, a second viewing time zone of a news genre content and a third viewing time zone of a drama genre content, and wherein the recommending of the abbreviated content includes:

if the user viewing situation changes to a channel with a sports match during the first viewing time zone, recommending the abbreviated content for the sports match from a start of the sports match to a present, if the user viewing situation changes to a news channel during the second viewing time zone, recommending the abbreviated content for a latest news, and if the user viewing situation changes to a drama broadcast during the third viewing time zone, recommending the abbreviated content for previous episodes of the drama broadcast.

* * * * *